(12) United States Patent
Cenko

(10) Patent No.: US 10,131,012 B2
(45) Date of Patent: Nov. 20, 2018

(54) COLLISION SENSING SYSTEM FOR ROTARY WELDING TORCH

(71) Applicant: Arben Cenko, Windsor (CA)

(72) Inventor: Arben Cenko, Windsor (CA)

( * ) Notice: Subject to any disclaimer, the term of this patent is extended or adjusted under 35 U.S.C. 154(b) by 308 days.

(21) Appl. No.: 15/054,248

(22) Filed: Feb. 26, 2016

(65) Prior Publication Data

US 2016/0279728 A1 Sep. 29, 2016

Related U.S. Application Data

(60) Provisional application No. 62/138,506, filed on Mar. 26, 2015.

(51) Int. Cl.
| | |
|---|---|
| *B23K 9/10* | (2006.01) |
| *B23K 9/32* | (2006.01) |
| *B23K 9/28* | (2006.01) |
| *B23K 37/00* | (2006.01) |
| *B23Q 5/58* | (2006.01) |

(52) U.S. Cl.
CPC .................. *B23K 9/10* (2013.01); *B23K 9/28* (2013.01); *B23K 9/321* (2013.01); *B23K 37/006* (2013.01); *B23Q 5/58* (2013.01)

(58) Field of Classification Search
CPC . B23K 9/10; B23K 9/28; B23K 9/321; B23K 37/006; B23K 9/285; B23K 9/287; B23Q 5/58; B25J 19/0029; B25J 19/063
USPC .................... 219/136, 137.31, 124.34, 125.1
See application file for complete search history.

(56) References Cited

U.S. PATENT DOCUMENTS

| | | | |
|---|---|---|---|
| 6,346,751 B1* | 2/2002 | Delfino .................. | B25J 19/063 307/119 |
| 7,002,102 B2 | 2/2006 | Munch et al. | |
| 2006/0043080 A1* | 3/2006 | Hubinger ............... | B23K 9/287 219/124.34 |
| 2011/0198332 A1* | 8/2011 | Cenko ................... | B23K 9/285 219/136 |

(Continued)

FOREIGN PATENT DOCUMENTS

| | | |
|---|---|---|
| DE | 202006014324 U1 | 11/2006 |
| GB | 2118524 | 11/1983 |
| KR | 880002441 | 7/1988 |

OTHER PUBLICATIONS

International Search Report and Written Opinion from PCT/IB2016/051586 dated Jun. 14, 2016.

*Primary Examiner* — Phuong Nguyen
(74) *Attorney, Agent, or Firm* — Warner Norcross + Judd LLP

(57) ABSTRACT

A collision sensing system includes an outer housing with a ball roller mounted thereto, a piston, a lower housing, and an electro/mechanical switch assembly having a contact ring. The piston includes a helical groove on its exterior and a tongue extending from a lower end thereof. The ball roller is positioned within the helical groove of the piston. The lower housing has a semi-spherical portion and a groove aligned with the piston tongue. A contact pin assembly extends through the piston and includes a contact pin positioned to contact the contact ring. The collision sensing system is configured such that deflection of a welding torch mounted to the lower housing misaligns the tongue and groove, slides the helical groove along the ball roller, thereby lifting the piston and breaking contact between the contact pin and contact ring.

17 Claims, 17 Drawing Sheets

(56) References Cited

U.S. PATENT DOCUMENTS

2012/0168413 A1\* 7/2012 Richtsfeld ............ B25J 19/0029
219/136

\* cited by examiner

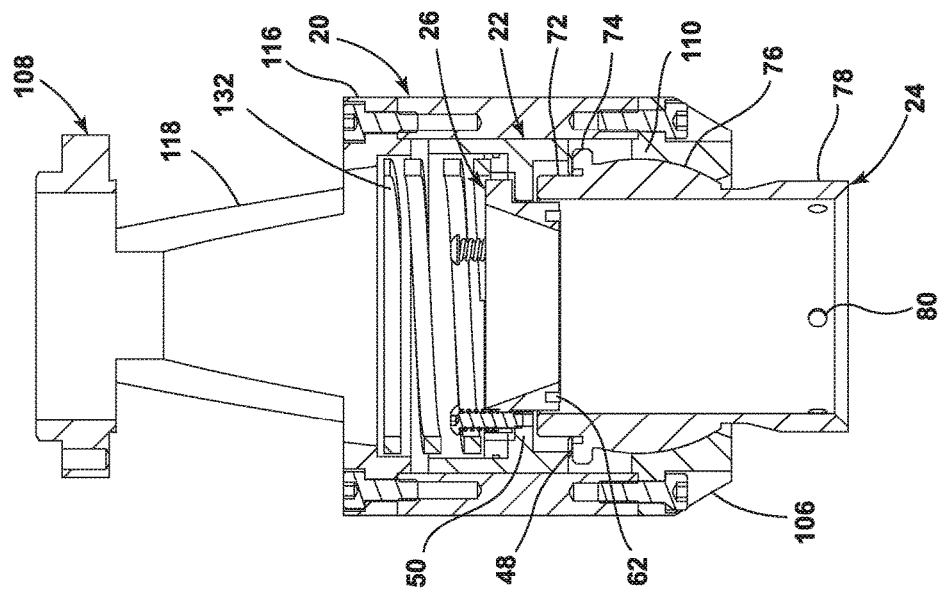
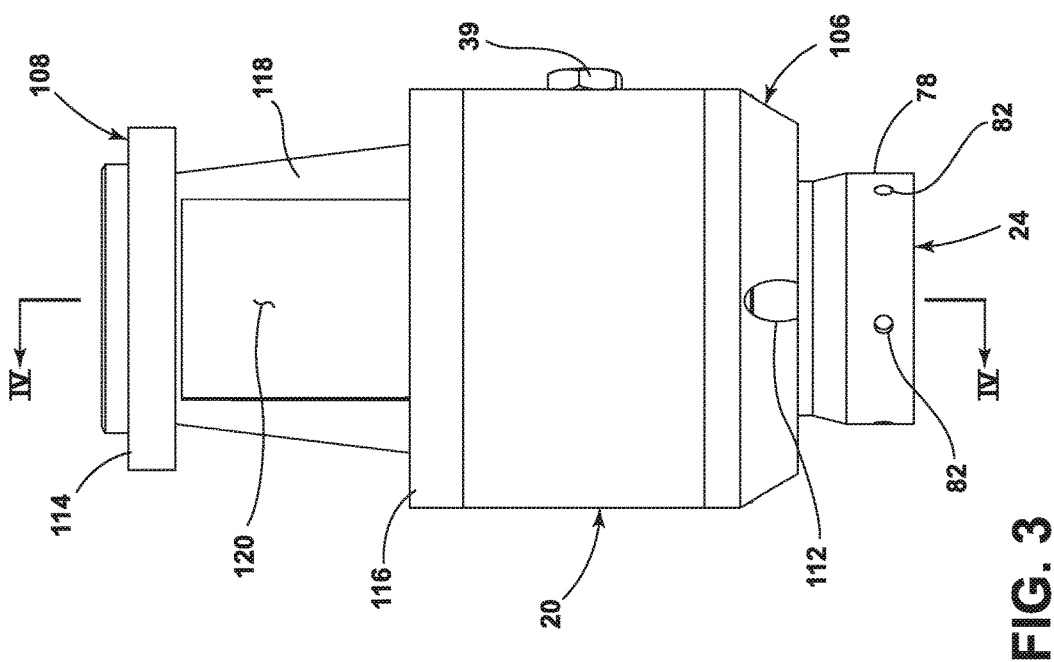
FIG. 4
FIG. 3

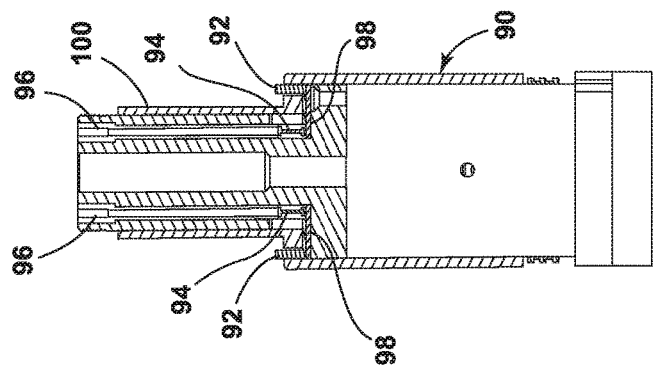
FIG. 12
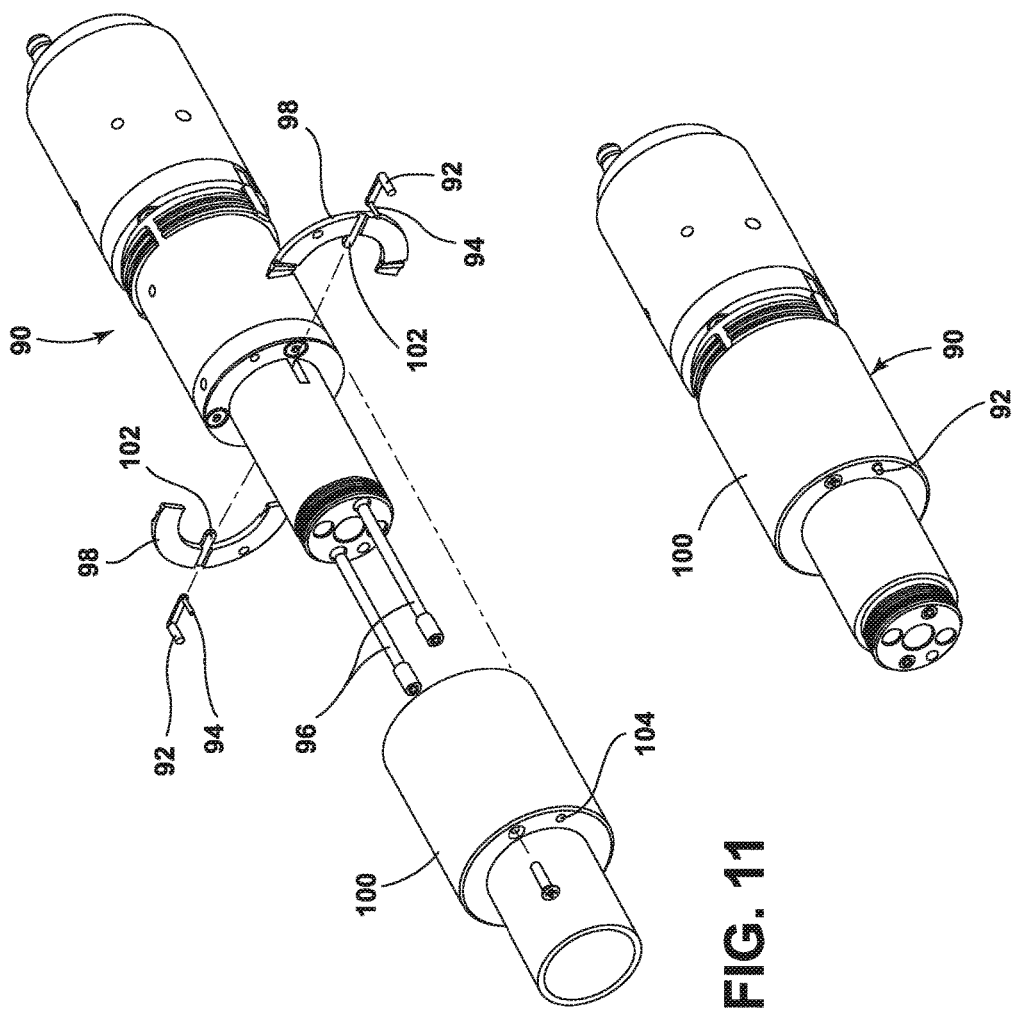
FIG. 11
FIG. 10

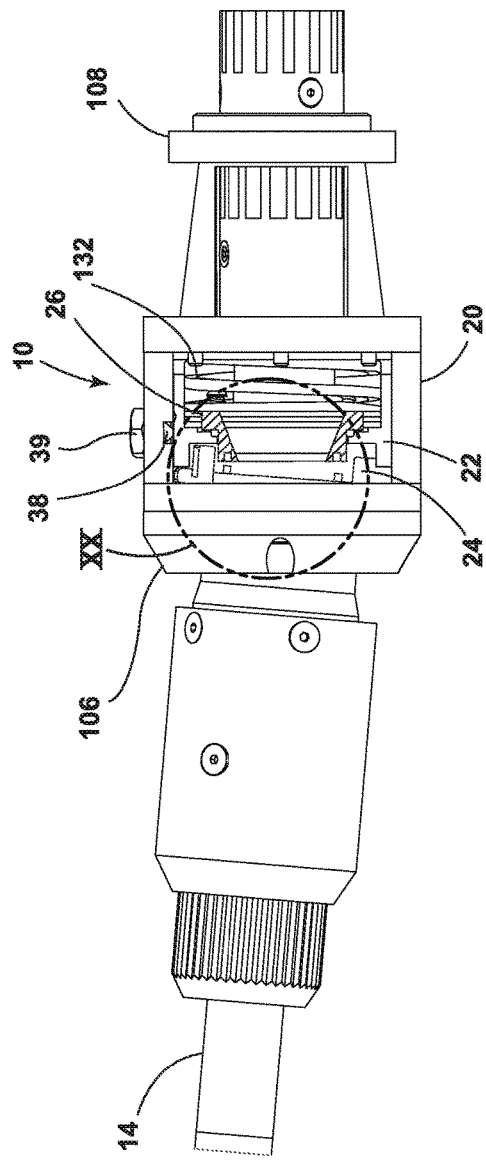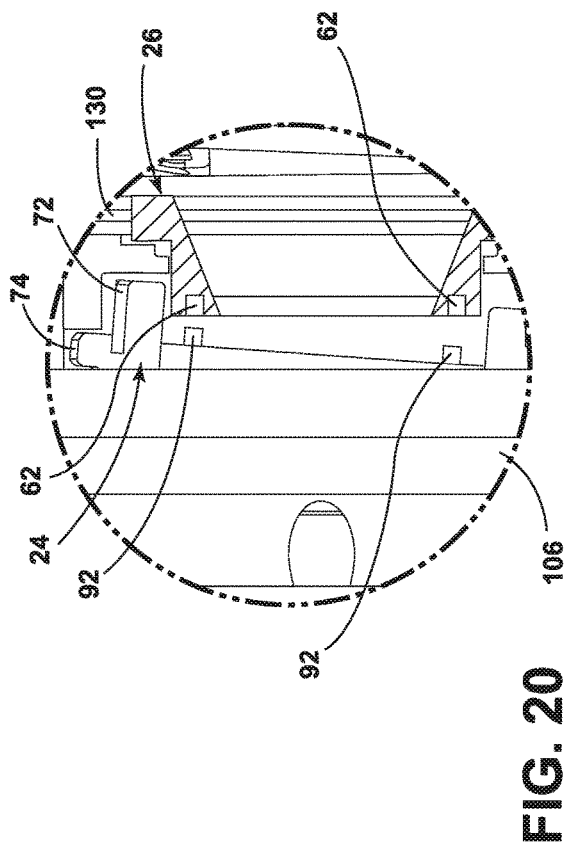
FIG. 19
FIG. 20

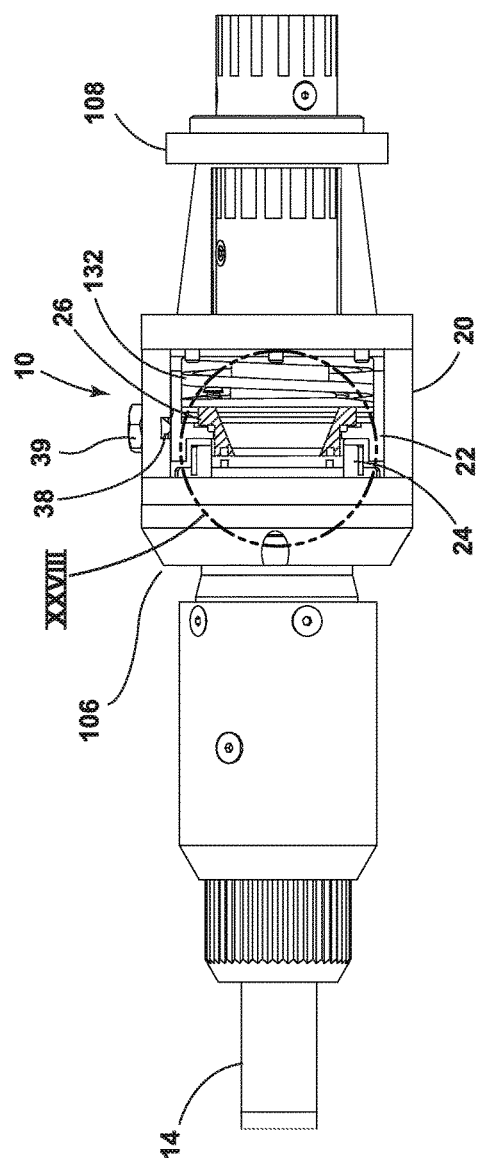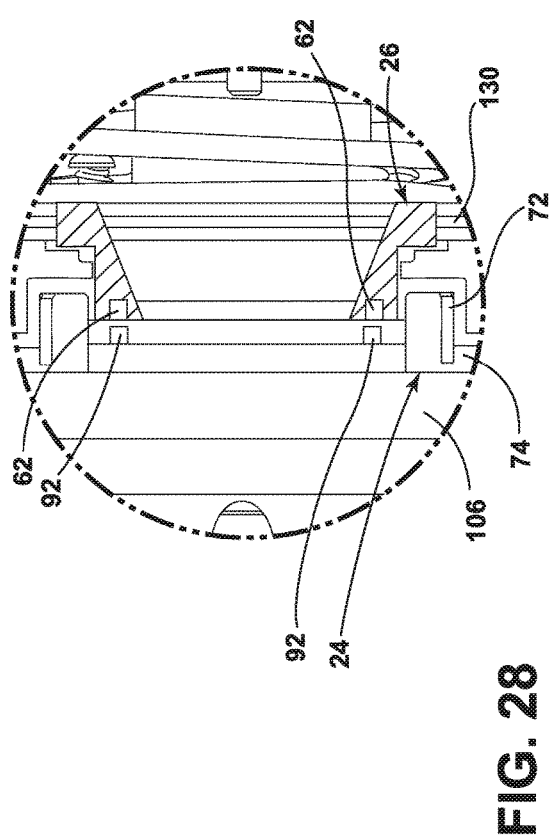
FIG. 27
FIG. 28

COLLISION SENSING SYSTEM FOR ROTARY WELDING TORCH

BACKGROUND OF THE INVENTION

The present invention relates to a collision sensing system for the field of robotic welding, and more particularly to a collision sensing system for use with rotary welding torches used in a hollow wrist robotic application.

A rotary welding torch, such as a torch that may be used with the present invention, is typically a welding torch that provides unrestricted bidirectional rotation during the welding process.

Robotic manufacturers generally include some form of collision sensing to help prevent damage to the robot itself in the event of a collision. However, this may not prevent damage to the end of arm tooling, such as a rotary welding torch. Accordingly, end users often require so-called collision detectors or collision sensor units to prevent further damage to the end of arm tooling.

Some robotic manufacturers have designed other types of collision detectors for offset arm robots or collision sensor units with motion sensors. However, given the high temperatures developed during the welding process, these configurations tend to fail due to the sensor's incompatibility with a high temperature environment.

SUMMARY OF THE INVENTION

In contrast, the collision sensing system disclosed herein offers a simple solution to the noted issues caused by this high temperature environment. The present collision sensing system utilizes an electro/mechanical switch which is not affected by the temperature changes in the system. The collision sensing system also provides for quick termination of operation of the robotic arm and/or the rotary welding torch in the event of a collision experienced by the affixed rotary welding torch.

The collision sensing system enables unrestricted rotation of the rotary welding torch, to accommodate the design and features of rotary welding torch applications.

As disclosed, the collision sensing system includes an outer housing with a ball roller set screw mounted thereto, a piston, a lower housing, and an electro/mechanical switch assembly. An exterior surface of the piston includes a helical groove, and a first end of the piston includes at least one tongue. The ball roller set screw is positioned to travel along the helical groove of the piston. The lower housing has a semi-spherical portion and at least one groove aligned with the tongue of the piston. The electro/mechanical switch assembly is positioned within the piston and includes a contact ring. The collision sensing system also includes a contact pin assembly that has at least one contact pin positioned to contact the contact ring. The collision sensing system is configured such that deflection in the X and/or Y direction of a rotary welding torch mounted to the collision sensing system may move the lower housing about the X and/or Y axis, misaligning the tongue and groove and sliding the helical groove along the ball roller set screw. Unseating the tongue from the groove rotates and lifts the piston up, breaking contact between the at least one contact pin and contact ring.

The contact pin assembly is operably connected to the rotary welding torch and/or the robotic arm, and breaking contact between the at least one contact pin and contact ring terminates operation of the rotary welding torch and/or the robotic arm.

According to another embodiment, rotating the lower housing forces the tongue and groove out of alignment, thereby lifting the piston upward and breaking contact between the at least one contact pin and contact ring.

These and other features and advantages of the invention will be more fully understood and appreciated by reference to the entire application including the specification, the claims, and the drawings.

BRIEF DESCRIPTION OF THE DRAWINGS

FIG. 3 is a side view of the collision sensing system;

FIG. 4 is a cross sectional view of the collision sensing system taken along line IV-IV of FIG. 3;

FIG. 10 is a perspective view of a contact pin assembly of the collision sensing system;

FIG. 11 is a partially exploded view of the contact pin assembly;

FIG. 12 is a cross sectional view of the contact pin assembly;

FIG. 19 is a partial cross sectional view of the collision sensing system and rotary welding torch, resulting from the first exemplary collision illustrated in FIG. 18;

FIG. 20 is a detail view of the collision sensing system and rotary welding torch of FIG. 19, resulting from the first exemplary collision illustrated in FIG. 18;

FIG. 27 is a partial cross sectional view of the collision sensing system and rotary welding torch, resulting from the third exemplary collision illustrated in FIG. 24;

FIG. 28 is a detail view of the collision sensing system and rotary welding torch of FIG. 27, resulting from the third exemplary collision illustrated in FIG. 24.

DESCRIPTION OF THE CURRENT EMBODIMENT

Figure 1:
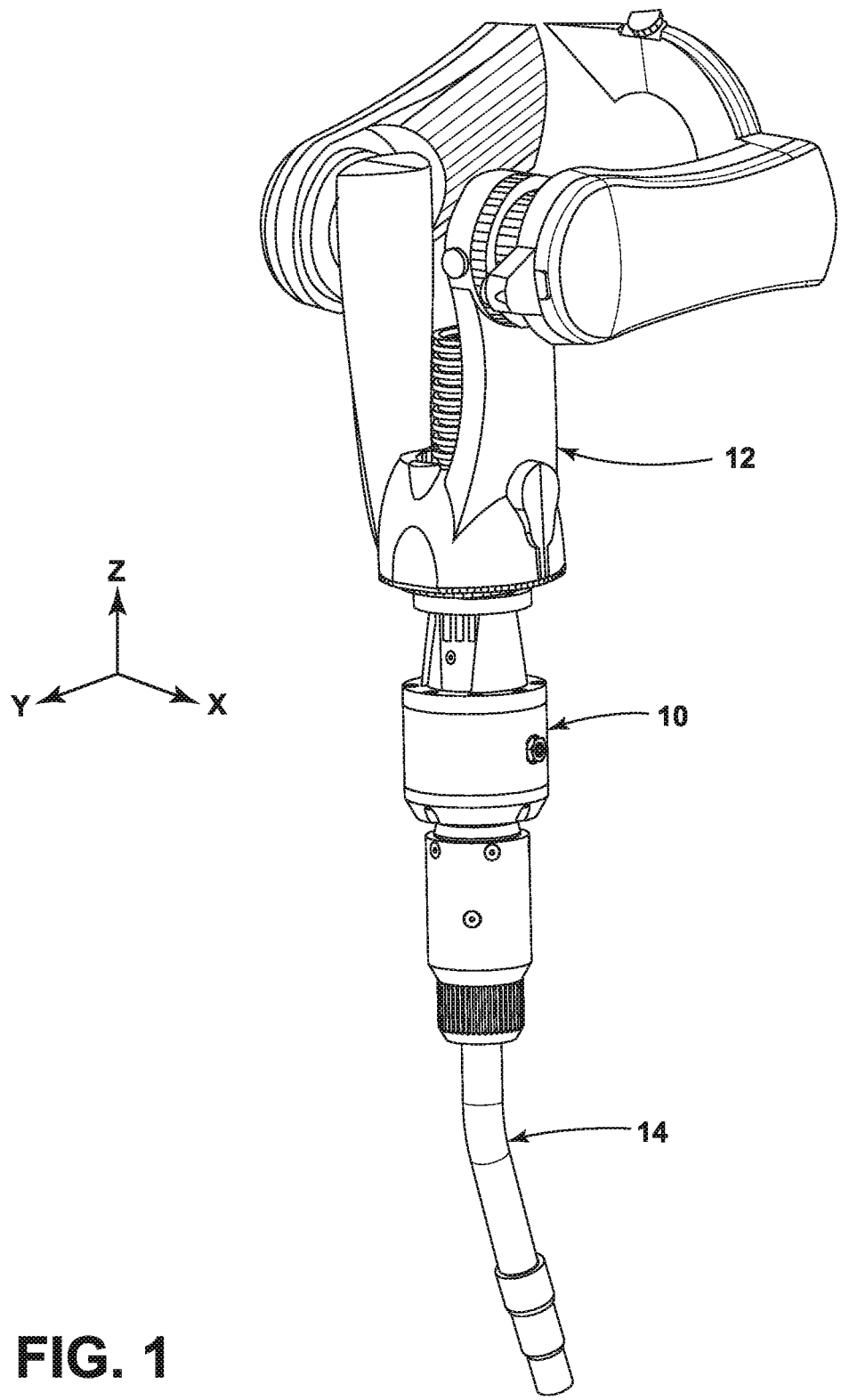
FIG. 1 is a perspective view of a collision sensing system according to one embodiment of the present invention, the collision sensing system is shown mounted to a robotic arm and a rotary welding torch.
Figure 2:
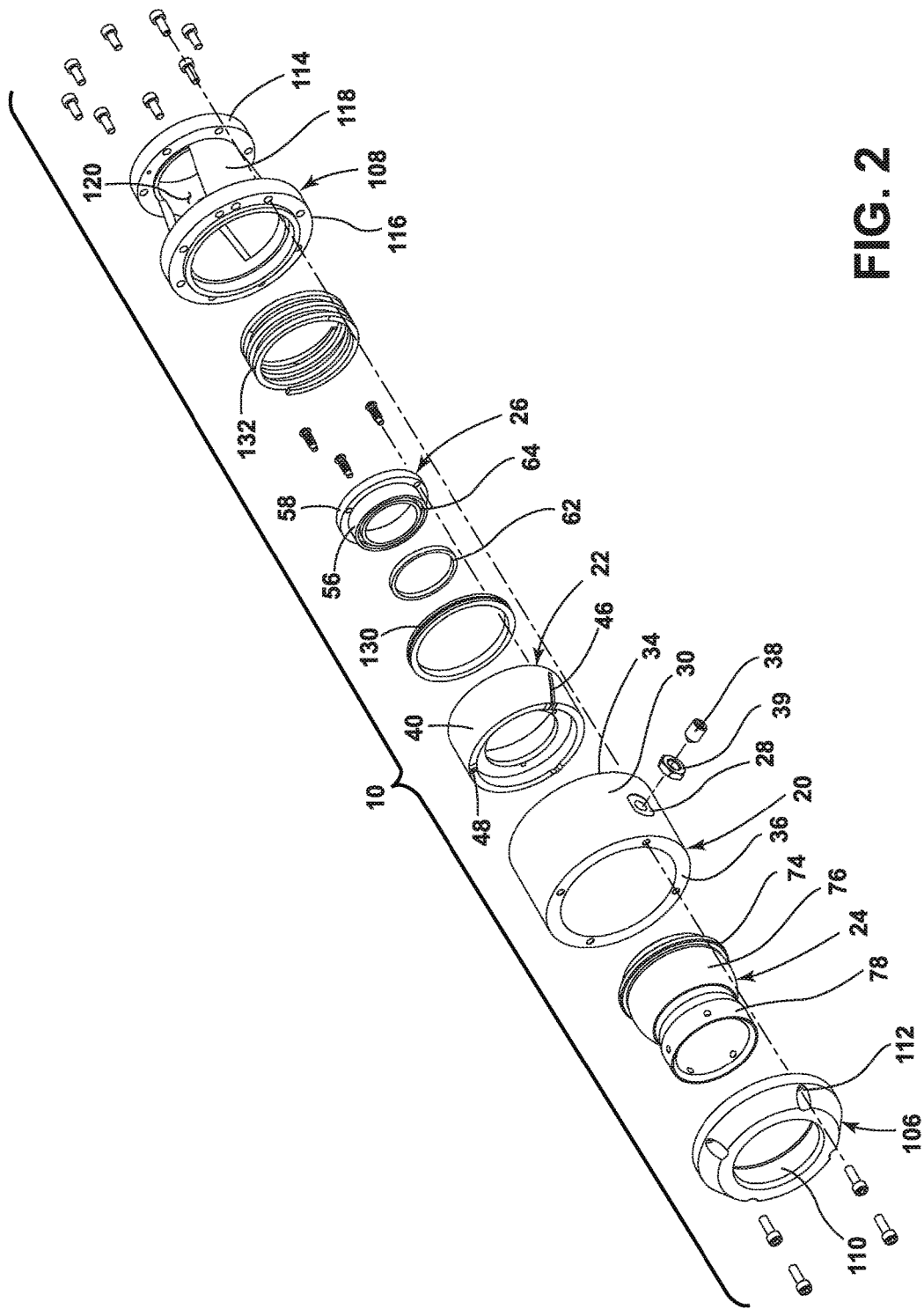
FIG. 2 is an exploded view of the collision sensing system.
Figure 5:
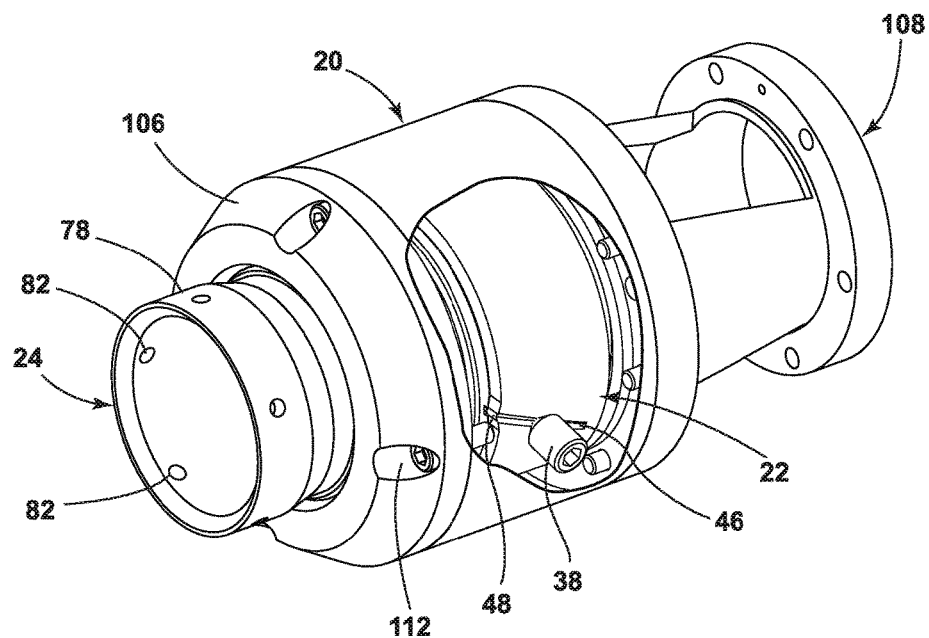
FIG. 5 is partial cut-away view of the collision sensing system.
Figure 6:
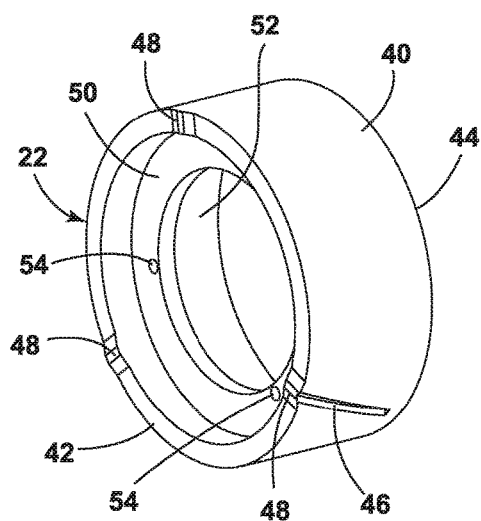
FIG. 6 is a bottom perspective view of a piston of the collision sensing system.
Figure 7:
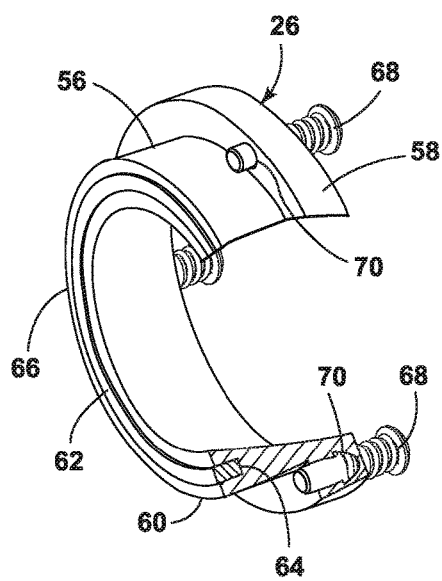
FIG. 7 is a bottom perspective view of an electro/mechanical switch assembly of the collision sensing system.
Figure 8:
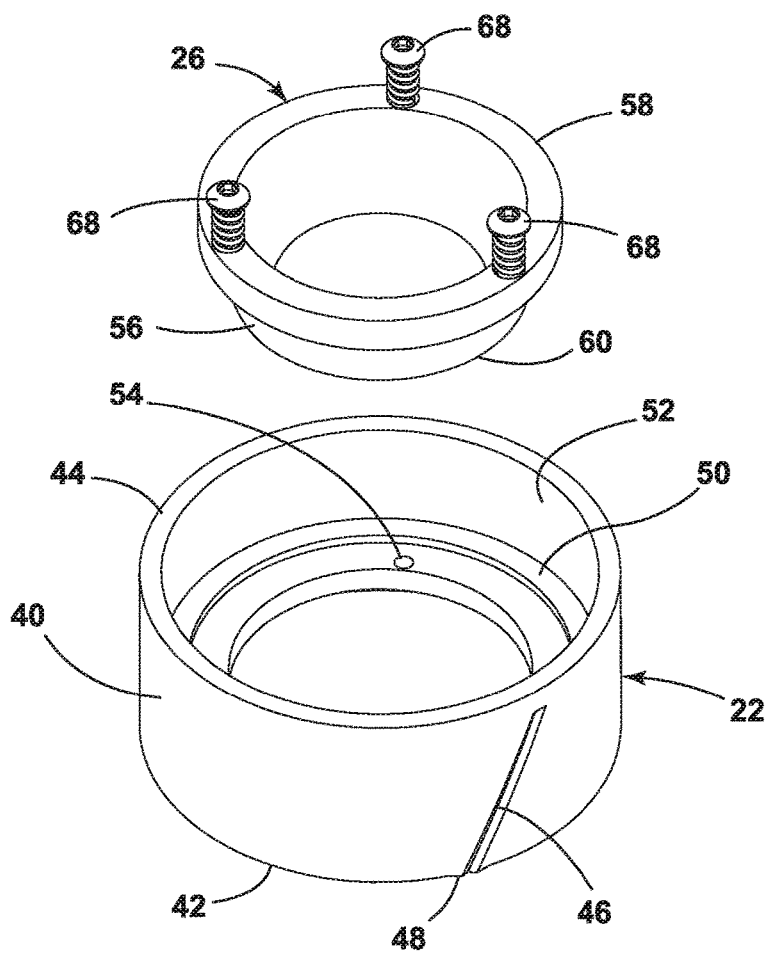
FIG. 8 is an exploded view of the piston and electro/mechanical switch assembly.
Figure 9:
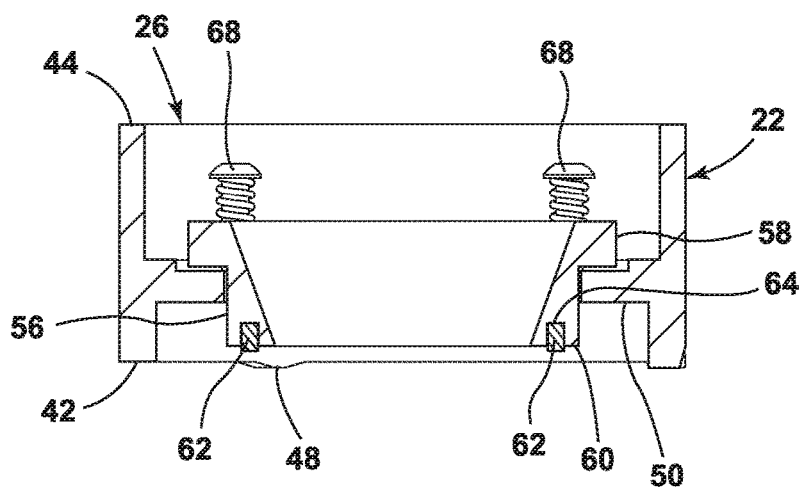
FIG. 9 is a cross sectional view of the piston and electro/mechanical switch assembly.

A collision sensing system 10 according to an embodiment of the invention is illustrated in FIGS. 1-29. The collision sensing system 10 may be used with robotic applications and is shown mounted to a robotic arm 12 and a rotary welding torch 14. Although FIG. 1 illustrates the collision sensing system 10 as part of a welding operation, this is only exemplary. The collision sensing system 10 may be generally used in connection with other automated or robotic manufacturing operations.

Throughout this description, directional terms, such as "upper", "lower", "inner", "outer", "front", and "rear", are used based on the orientation of the embodiment shown in the drawings. The longitudinal axis of the collision sensing system 10 defines the Z-axis, as labeled in FIG. 1. The use of directional terms does not limit the embodiment or the invention to any specific orientation(s).

I. Structure

The collision sensing system 10 includes an outer housing 20, a piston 22, a lower housing 24, and an electro/mechanical switch assembly 26. The outer housing 20 is cylindrical and has a mounting hole 28 through a sidewall 30 and threaded mounting holes 32 in upper and lower ends 34, 36 of the outer housing 20. A ball roller, illustrated as ball roller set screw 38, is installed into the mounting hole 28 and may be secured by a locking nut 39.

Referring to FIGS. 2, 6, 8, and 9, the piston 22 is cylindrical and defines an exterior surface 40 and first and second opposed ends 42, 44. The exterior surface 40 includes a helical groove 46 that helically extends up from the first end 42. The first end 42 includes at least one tongue 48 that protrudes below the first end 42. In the illustrated example, the piston 22 has three spaced tongues 48; however, more or fewer tongues are possible. Further, a flange or shoulder 50 is disposed on an interior surface 52 of the piston 22; the shoulder 50 includes mounting holes 54.

Referring now to FIGS. 2 and 7-9, the electro/mechanical switch assembly 26 is also cylindrical and includes a contact ring base 56 that has an upper rim 58 and an opposed lower end 60. An electrically conductive contact ring 62 is pressed in a recess 64 that is formed in a surface 66 of the lower end 60. The contact ring 62 is configured to extend at least slightly below the surface 66. The electro/mechanical switch assembly 26 also includes spring loaded fasteners 68 which are received in mounting holes 70 through the upper rim 58 of the contact ring base 56. Of note, the contact ring base 56 is made of an electrically insulating material.

Referring back to FIG. 2, the lower housing 24 is irregularly shaped and hollow and includes an upper collar 72, a flange 74, a semi-spherical portion 76, and a lower mounting portion 78. The flange 74 is positioned between the upper collar 72 and the semi-spherical portion 76 and extends therefrom. Additionally, the flange 74 includes at least one groove 80 recessed into the surface of the flange 74. In the illustrated example, the flange 74 includes three spaced grooves 80; however, more or fewer grooves are possible given that they align with the tongues. Further, the lower mounting portion 78 includes a plurality of mounting holes 82.

Referring to FIGS. 10-12, the collision sensing system 10 includes a contact pin assembly 90 operably connected to the rotary welding torch 14 and/or robotic arm 12. The contact pin assembly 90 has at least one electrically conductive contact pin 92, a coupling pin 94, a female butt connector 96, interlocking contact pin seats 98, an insulating cap 100, and a cable attachment member 102. The contact pin 92 and coupling pin 94 are plate welded together and are affixed in a recess 102 in one of the contact pin seats 98. The contact pin seats 98 are electrically insulated, preventing the contact pin assembly 90 from enabling unintended current paths or electrical shorts in the system. The insulated female butt connector 96 is inserted over the coupling pin 94 is and configured to electrically connect the coupling pin 94 to a power supply from the robotic arm 12. The insulating cap 100 encloses the components of the contact pin assembly 90 and includes a pin hole 104 through which the contact pin 92 extends.

Figure 13:
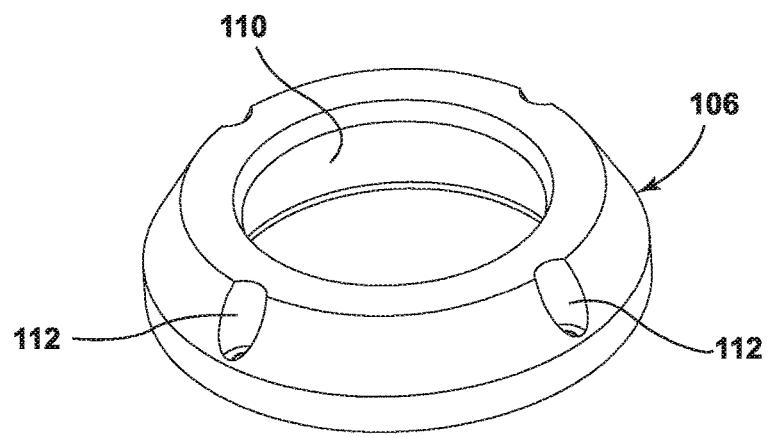
FIG. 13 is a bottom view of a bottom cap of the collision sensing system.
Figure 14:
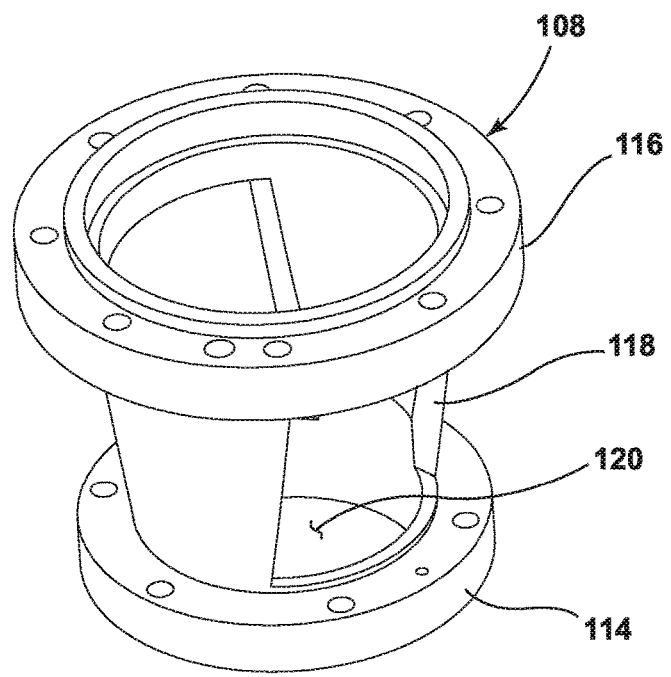
FIG. 14 is a bottom view of a top cap of the collision sensing system.

The collision sensing system 10 includes a bottom cap 106 and a top cap 108, as shown in FIGS. 13 and 14. The bottom cap 106 is ring-shaped and includes a semi-spherical interior portion 110 and a plurality of mounting holes 112 around a periphery thereof. The semi-spherical interior portion 110 complements the semi-spherical interior portion 76 of the lower housing 24. The top cap 108 includes an upper mounting ring 114, a lower mounting ring 116, and a cylindrical sidewall 118 that connects the mounting rings 114, 116. The sidewall 118 includes spaced openings 120 therethrough. The top cap 108 defines an interior space within the sidewall 118 and the openings 120 which allows the cable attachment and the cable conduit to be readily moved and bent during movement of the robotic arm 12.

The collision sensing system 10 also includes a thrust bearing 130 and compression spring 132, both positioned inside the upper portion of the piston 22.

Referring now to the cross-sectional view shown in FIG. 4, the relationship between the assembled components is illustrated. The bottom cap 106 is mounted to the lower end 36 of the outer housing 20 by fasteners that pass through mounting holes 112 and are secured in threaded holes 32 in the outer housing 20. The lower housing 24 is positioned within the outer housing 20, and the semi-spherical portions 76, 110 of the respective lower housing 24 and bottom cap 106 are nested together. The lower mounting portion 78 extends through the bottom cap 106. In addition, the ball roller set screw 38 is threaded into the mounting hole 28 in the sidewall 30 of the outer housing 20 and locking nut 39 may secure the ball roller set screw 38 in place.

The piston 22 is positioned within the outer housing 20, atop the lower housing 24, and is oriented within the outer housing 20 such that the tongues 48 are aligned, mated, or seated within the grooves 80 in the flange 74 of the lower housing 24. An end of the ball roller set screw 38 is positioned within the helical groove 46 of the piston 22. This described orientation, where the tongue 48 and groove 80 are aligned defines a resting or home position A, as illustrated in FIGS. 4-5, and 16-17.

The thrust bearing 130 is positioned inside the piston 22, adjacent the shoulder 50. The electro/mechanical switch assembly 26 is also positioned within the piston 22; the thrust bearing 130 encircles the upper rim 58 of the contact ring base 56. The contact ring base 56 is affixed with spring loaded fasteners 68 to the mounting holes 54 in the shoulder 50 of the piston 22. The spring loaded fasteners 68 bias the contact ring base 56 against the piston 22. The compression spring 132 is positioned, partially, within the piston 22 and is seated adjacent the thrust bearing 130. The thrust bearing 130 and compression spring 132 preload the contact between the tongue 48 and groove 80 of the piston 22 and lower housing 24 and between the lower housing 27 and bottom cap 106, thereby maintaining the position of the piston 22 and the contact between the contact pins 90 and contact ring 62 during movement of the rotary welding torch 14.

Figure 15:
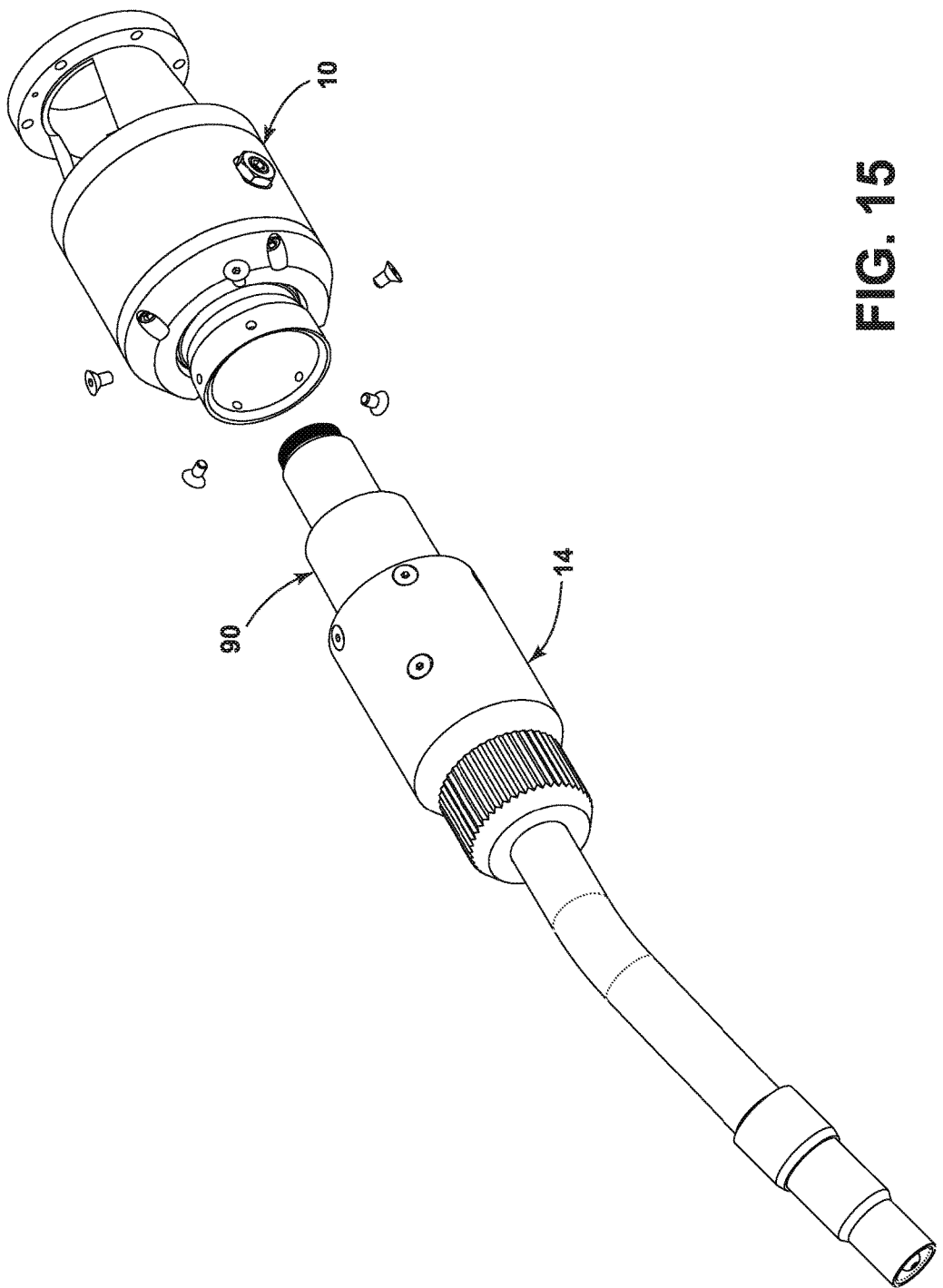
FIG. 15 is a perspective view of a rotary welding torch to be mounted to the collision sensing system.
Figure 16:
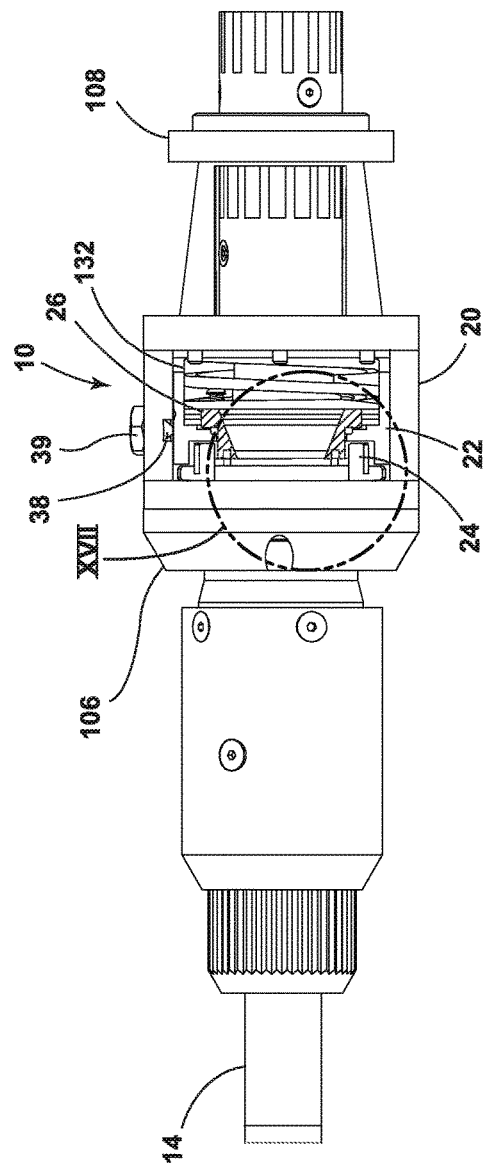
FIG. 16 is a partial cross sectional view of the collision sensing system and rotary welding torch, illustrating a home position A.
Figure 17:
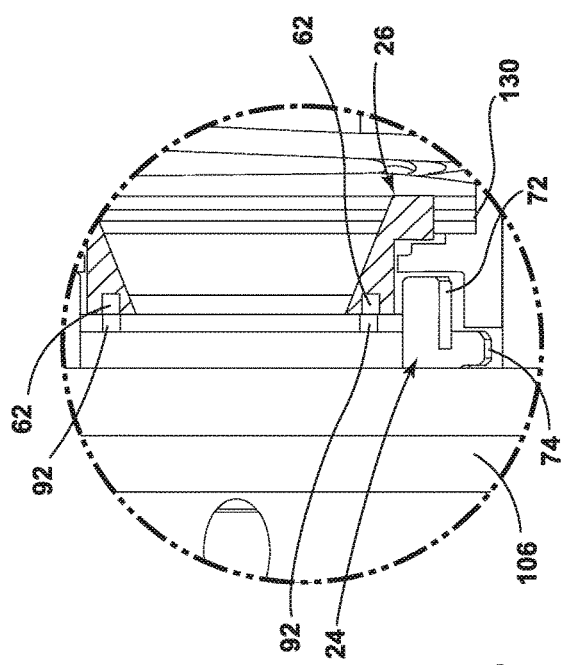
FIG. 17 is a detail view of the collision sensing system and rotary welding torch of FIG. 16.

The contact pin assembly 90 extends through the bottom cap 106, lower housing 24, and piston 22 and is affixed to the lower mounting portion 78 of the lower housing 24 using screws or other fasteners, as illustrated in FIG. 15. In this home position A, the contact pin 92 is in contact with the contact ring 62. The top cap 108 covers the upper end 34 of the outer housing 20, and is mounted to the outer housing 20 with screws or fasteners that affix the upper mounting ring 114 to the outer housing 20.

The upper end of the contact pin assembly 90 may be connected to a robotic arm 12 that extends down into the top cap 108 and the top cap 108 is affixed to the robotic arm 12. The rotary welding torch 14 may be mounted to the lower end of the contact pin assembly 90.

II. Operation

The collision sensing system 10 may be used in a robotic welding and manufacturing application. The collision sensing system 10 is configured to detect deflection of at least the lower housing 24 in the X and/or Y directions, as illustrated in FIGS. 18-27. More specifically, in use with a robotic arm 12 and rotary welding torch 14, the collision sensing system 10 is configured to sense a collision between the rotary welding torch 14 and a surrounding welding fixture 150 or other structure. When such a collision occurs, the rotary welding torch 14 is deflected relative to the collision sensing system 10 and the robotic arm 14.

Figure 18:
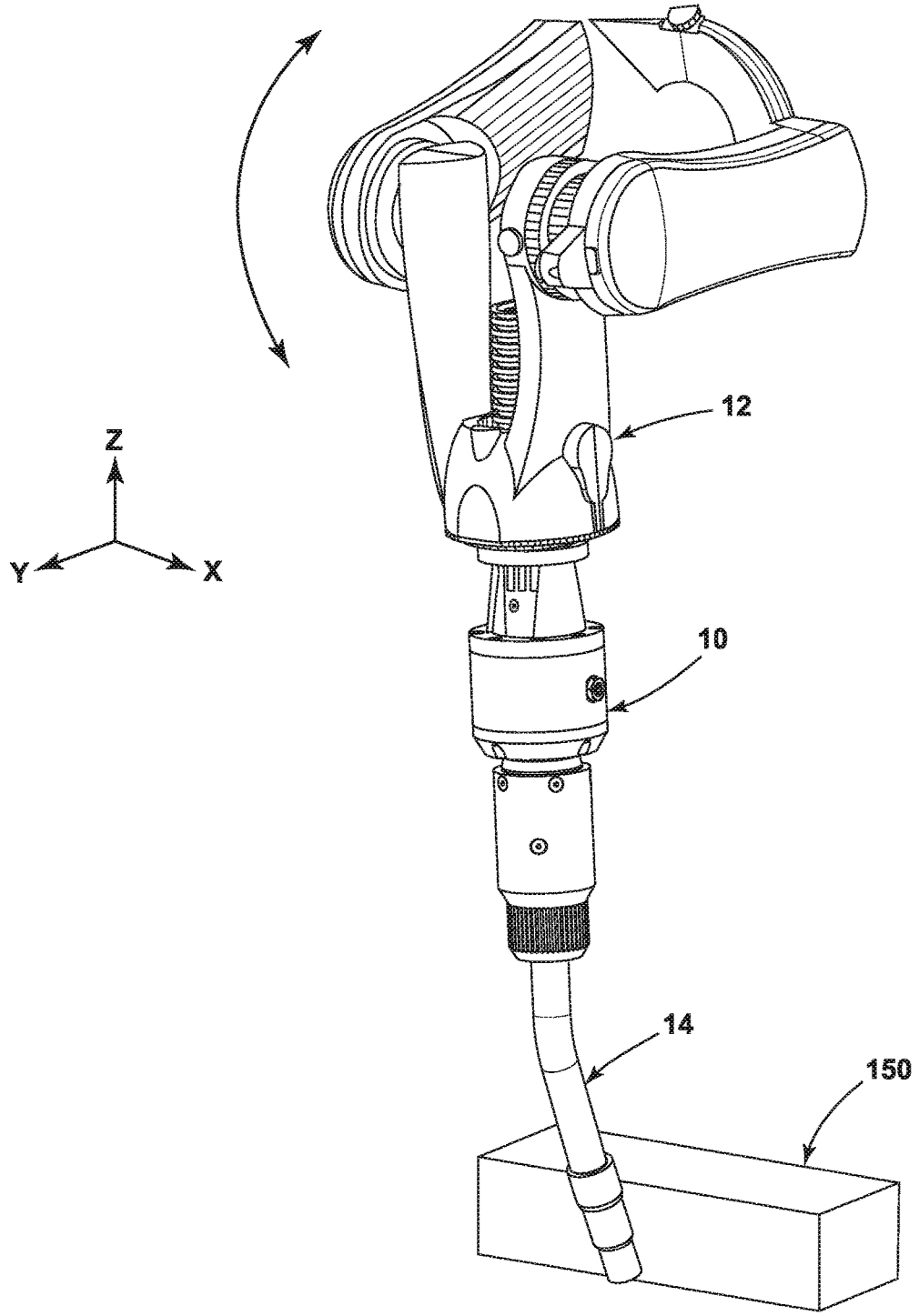
FIG. 18 is a perspective view of the collision sensing system, robotic arm, and rotary welding torch, illustrating a first exemplary collision.

One example of a collision is illustrated in FIG. 18. In this example, the robotic arm 12 is pivoted about the X axis and the welding torch 14 is obstructed by an object such as a welding fixture 150. This obstruction restricts movement of the torch 14 in the Y direction. Because the welding torch 14 is mounted to the lower housing 24, deflection of the welding torch 14 in the Y (and/or X) direction causes the lower housing 24 to also move/deflect, setting off a chain reaction of movement within the collision sensing system 10.

Referring to FIGS. 19 and 20, and as described above, the lower housing 24 is received within the bottom cap 106 in a ball-and-socket style fitting, with respective semi-spherical portions 76, 110 mated together. This described fitting allows the lower housing 24 the freedom of rotation to pivot about the X and Y axis within the bottom cap 106, as well as to spin about the Z axis. When the end of the welding torch 14 is deflected in the Y direction, as illustrated in FIG. 18, the lower housing 24 pivots about the X axis, in the Y direction.

Pivoting the lower housing 24 lifts the piston 22 (to the right as orientated in FIGS. 19 and 20) within the outer housing 20. This movement also moves the contract ring base 56 up, which moves the contract ring 62 out of contact with the contact pins 92 extending up from the fixed contact pin assembly 90. Breaking contact between the contact ring 62 and the contact pins 92 terminates operation of the welding torch 14 and/or the robotic arm 12, preventing any damage (or further damage) to the welding torch 14.

Figure 21:
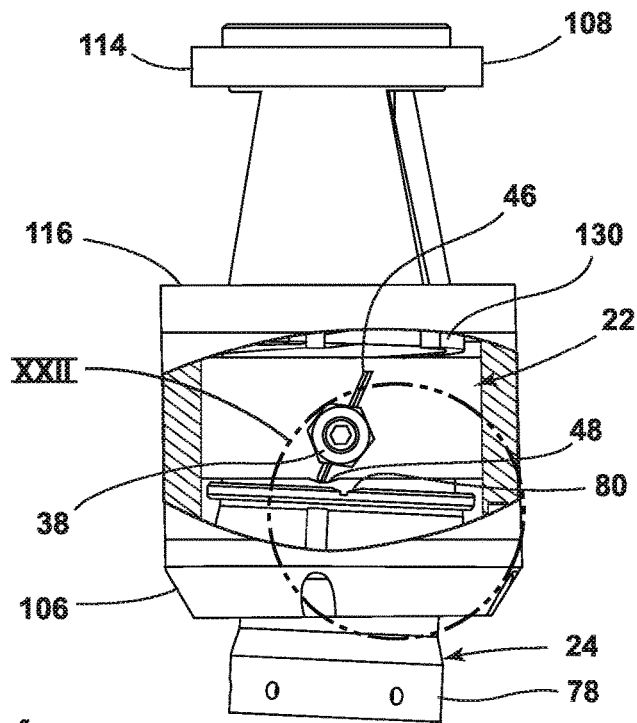
FIG. 21 is a partial cross sectional view of the collision sensing system, resulting from the first exemplary collision illustrated in FIG. 18.
Figure 22:
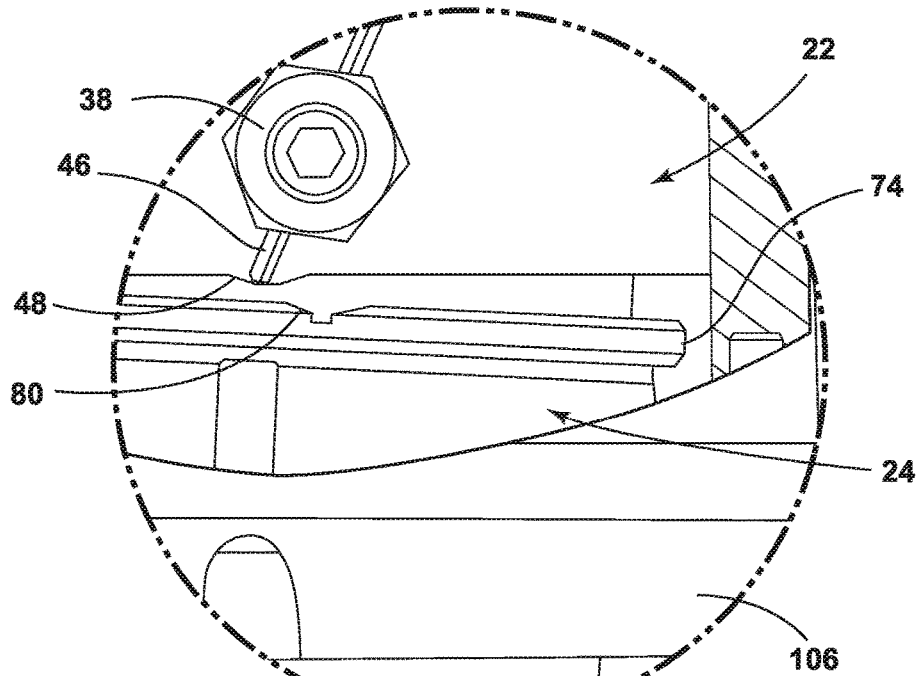
FIG. 22 is a detail view of the collision sensing system of FIG. 22, resulting from the first exemplary collision illustrated in FIG. 18.

Referring to FIGS. 21 and 22, due to the helical nature of the helical groove 46, lifting the piston 22 also rotates the piston 22. More specifically, lifting the piston 22 slides the helical groove 46 along the ball roller set screw 38 mounted through the outer housing 20, causing the piston 22 to rotate. When the piston 22 rotates, the tongue 48 necessarily rotates and pulls the tongue 48 and groove 80 out of alignment. The tongue 48 then contacts the surface of the lower housing 24 flange 74 instead of being seated within the groove 80.

The piston moves up due to two factors: unseating the tongue 48 and groove 80, and rotation of the piston 22 that translates to linear motion caused by the helical groove 46. Based on the dimensioning of both the tongue 48 and groove 80 and the slope of the helical groove 46, the upward piston 22 movement (lifting) can be either redundant or additive.

The piston 22 is preloaded by the compression spring 132, ensuring contact between the tongue 48 and groove 80 during movement of the robotic arm 12. This also preloads the semi-spherical portions 76, 100 of the respective lower housing 24 and bottom cap 106. Lifting the piston 22, as described above, causes the compression spring 132 to further compress, biasing the piston 22 to return to the home position A after the collision is over. Further, the thrust bearing 130 is positioned between the upper end of the piston 22 and the compression spring 132 and reduces friction when the piston 22 rotates during upward movement, allowing the collision sensing system 10 to rotate with ease.

It should be understood that deflection of the welding torch 14 and lower housing 24 is not necessarily purely in the X or Y direction; deflection may be in a combination of both the X and Y directions. Because the lower housing 24 is able to pivot within the bottom cap 106 about the X and Y axis, the deflection path defines a circle about the Z axis.

Further, in an embodiment where the collision sensing system 10 includes two or more contact pins 90, breaking contact between one contact pin 90 and the contact ring 62 terminates operation of the welding torch 14 and/or robotic arm 12. Contact need not be lost between all of the contact pins 90 and the contact ring 62 to terminate operation of the welding torch 14 and/or robotic arm 12.

Figure 23:
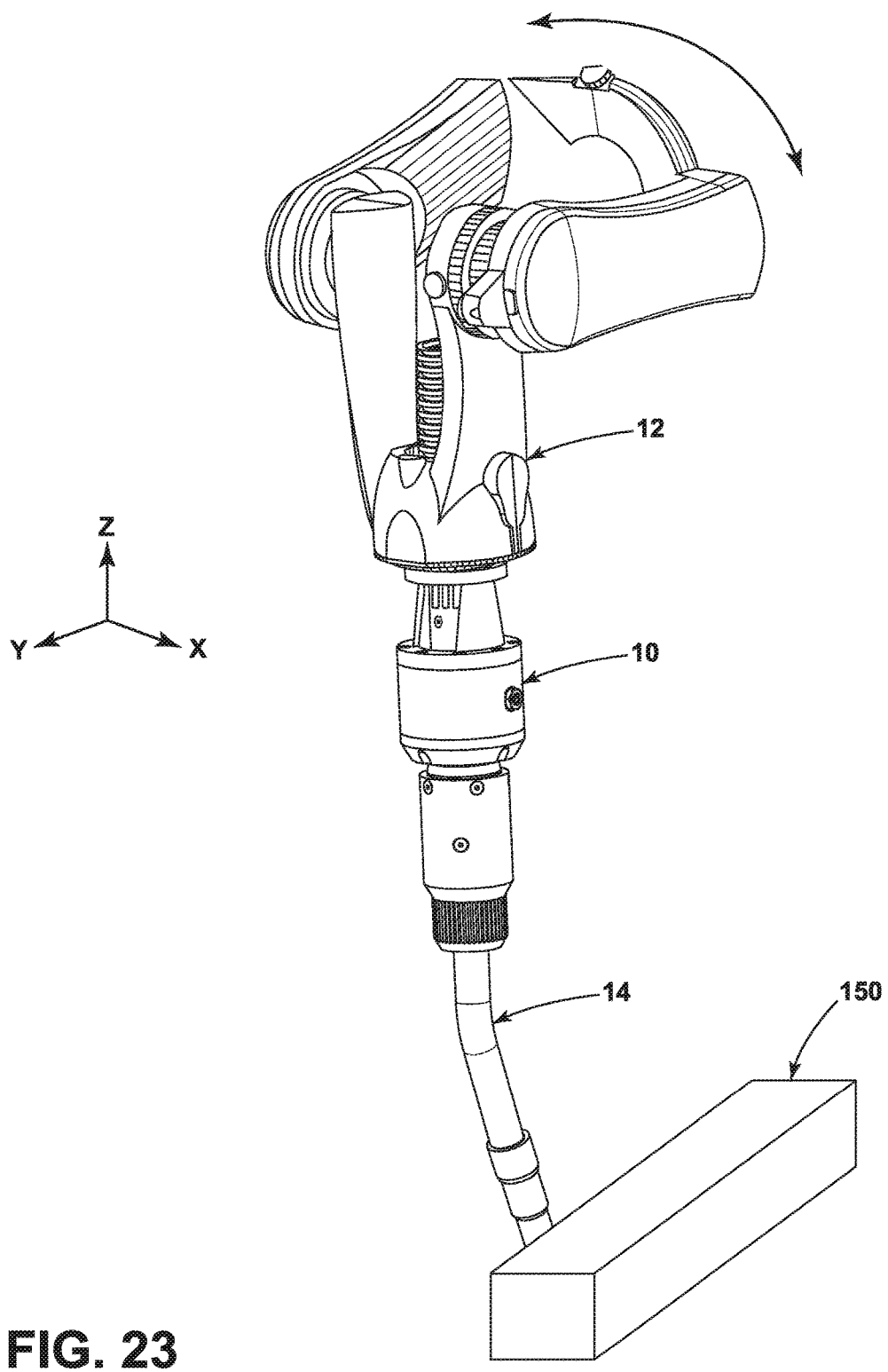
FIG. 23 is a perspective view of the collision sensing system, robotic arm, and rotary welding torch, illustrating a second exemplary collision.

Another example of a collision is illustrated in FIG. 23. In this example, the robotic arm 12 is pivoted about the Y axis and the welding torch 14 is obstructed by the welding fixture 150, restricting movement of the torch in the X direction. Deflecting the welding torch 14 in the X direction sets off substantially the same chain reaction of movement within the collision sensing system 10 as described above with respect to the collision illustrated in FIGS. 18-22. It should therefore be understood that operation of the welding torch 14 is terminated in substantially the same manner as described above.

Figure 24:
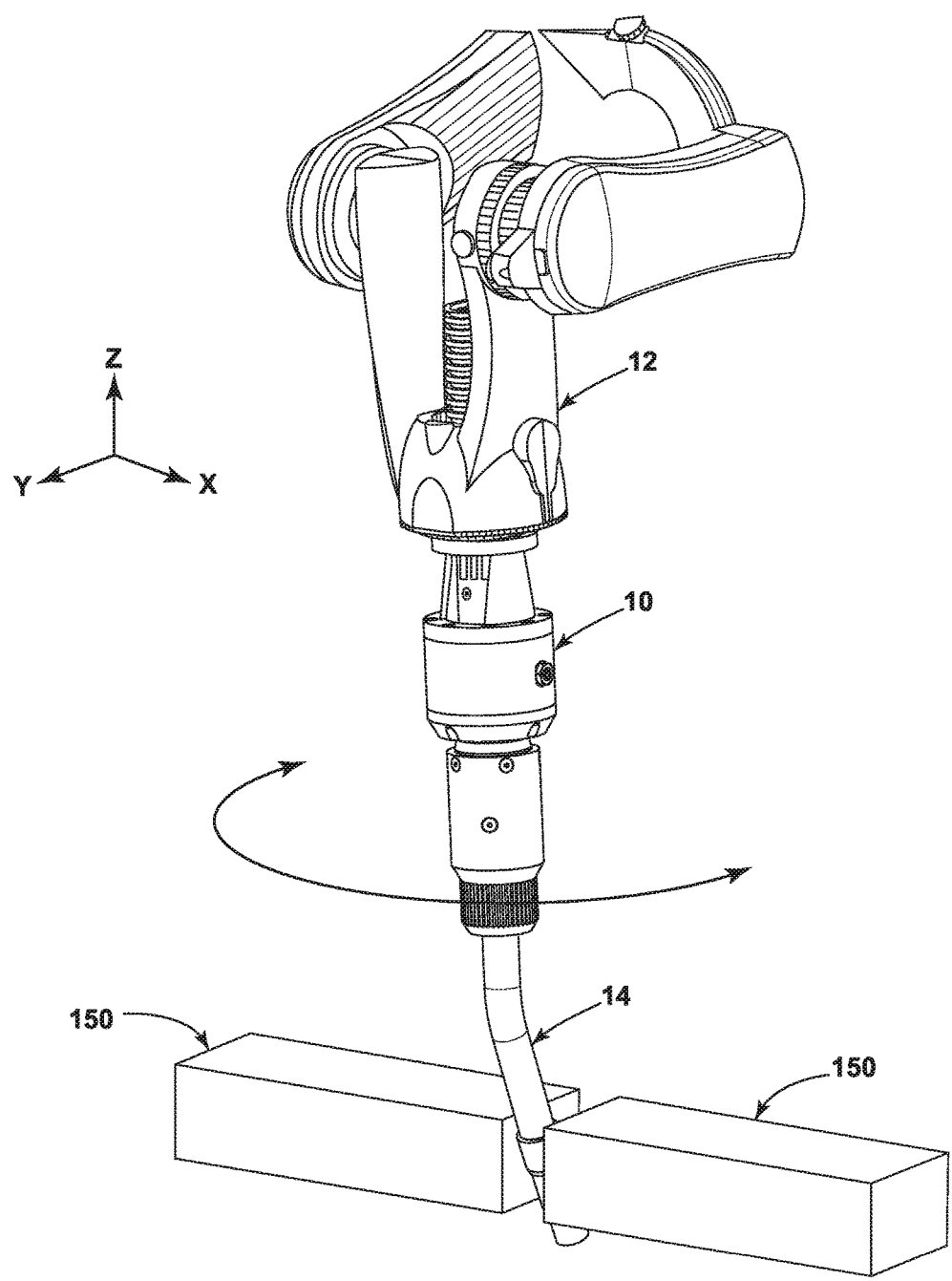
FIG. 24 is a perspective view of the collision sensing system, robotic arm, and rotary welding torch, illustrating a third exemplary collision.

Yet another example of a collision is illustrated in FIG. 24. In this example, rotation or spinning of the rotary welding torch 14 has become restricted because the torch is locked or pinched between two welding fixtures 150 or other structure. Restricting or ceasing the spinning of the welding torch 14 creates torsion through the collision sensing system 10 because the upper end of the system is driven by an electromotor mounted, for example, within the robotic arm 12. The welding torch 14 is mounted to the lower housing 24, therefore restricting rotation of the welding torch 14 causes the lower housing 24 to rotate relative to the piston 22, setting off a chain reaction of movement within the collision sensing system 10.

Figure 25:
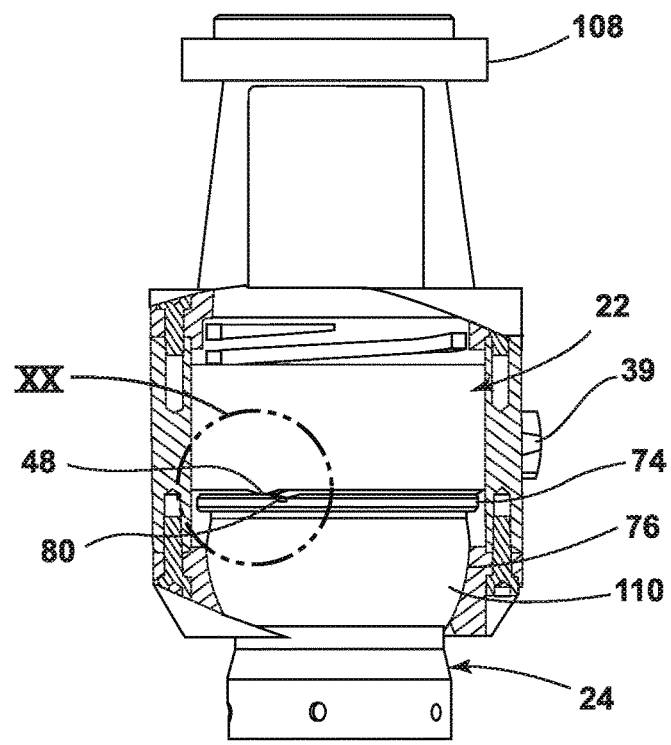
FIG. 25 is a partial cross sectional view of the collision sensing system, resulting from the third exemplary collision illustrated in FIG. 24.
Figure 26:
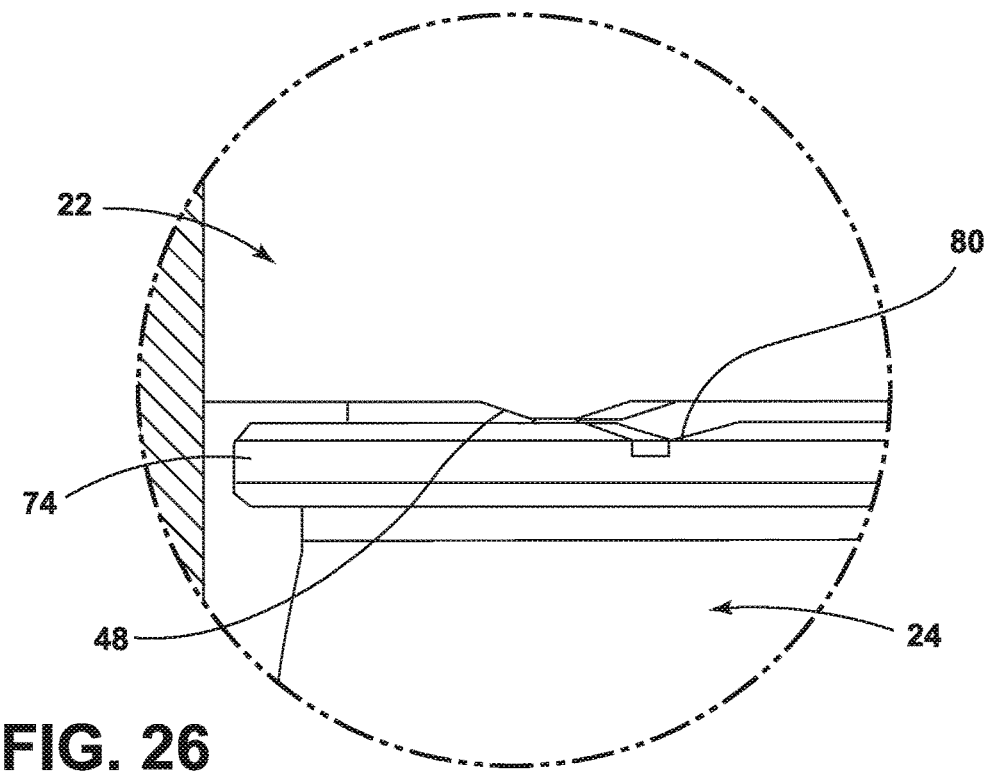
FIG. 26 is a detail view of the collision sensing system of FIG. 25, resulting from the third exemplary collision illustrated in FIG. 24.

Referring to FIGS. 25-26, and as described above, the lower housing 24 is free to spin within the bottom cap 106 about the Z axis. When the lower housing 24 rotates, the groove 80 necessarily rotates, forcing the tongue 48 and groove 80 connection to misalign.

Referring now to FIGS. 27-28, the misaligned tongue 48 lifts the piston 22 (to the right as oriented in FIGS. 27 and 28) within the outer housing 20, which also moves the contract ring base 56 up. Lifting the contact ring base 56 moves the contract ring 62 out of contact with the contact pins 92 that extend up from the contact pin assembly 90. Breaking contact between the contact ring 62 and the contact pins 92 terminates operation of the welding torch 14 and/or robotic arm 12, preventing any damage (or further damage) to the welding torch 14.

Figure 29:
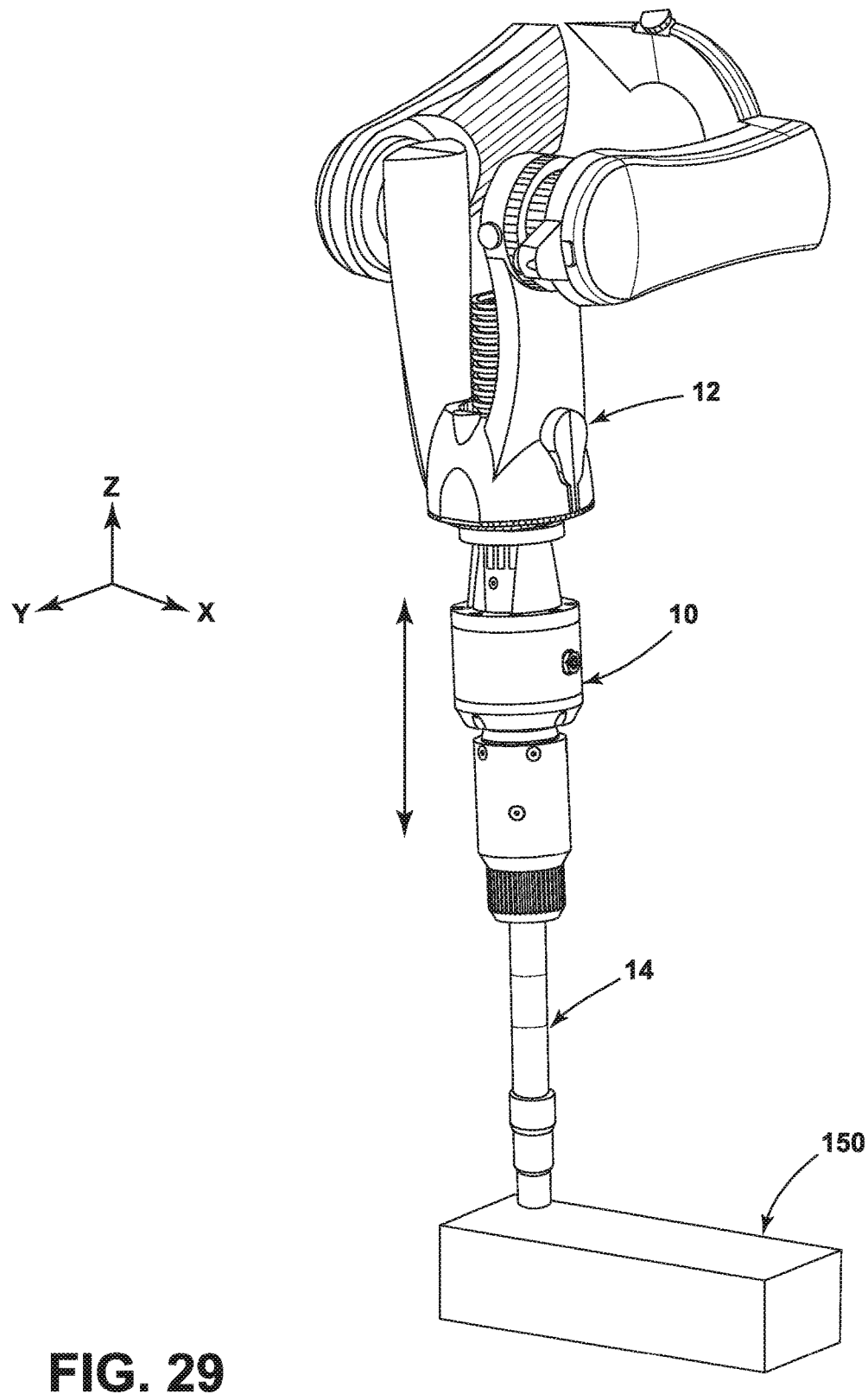
FIG. 29 is a perspective view of the collision sensing system, robotic arm, and rotary welding torch, illustrating a fourth exemplary collision.

Another example of a collision is illustrated in FIG. 29. In this example, the robotic arm 12 presses the welding torch 14 against the welding fixture 150, and motion is restricted in the Z direction. The force pushes the lower housing 24 up and lifts the piston 22 within the outer housing 20. Lifting the piston 22 also moves the contract ring base 56 up, breaking contact between the contact ring 62 and the contact pins 92 and terminating operation of the welding torch 14 and/or robotic arm 12, as described in full detail above.

The collision sensing system 10 described herein utilizes an electro/mechanical switch assembly 26 which is not affected by temperature changes caused by the high temperature welding operation. The collision sensing system 10 also provides for quick termination of operation of the robotic arm 12 and/or the rotary welding torch 14 in the event of a collision experienced by the affixed rotary welding torch 14.

The present collision sensing system 10 prevents damage to an affixed welding torch 14 when the torch is subjected to a collision while the robotic arm 12 is moving. The collision sensing system 10 is configured to quickly respond to deflection in any direction as well as restriction of spinning about the Z-axis.

Any reference to elements in the singular, for example, using the articles "a," "an," "the," or "said," is not to be construed as limiting the element to the singular.

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

The invention claimed is:

1. A collision sensing system for use with a rotary welding torch, the collision sensing system comprising:
    an outer housing including a ball roller mounted thereto;
    a piston defining an exterior surface and first and second opposed ends, the exterior surface including a helical groove extending up from the first end, the ball roller positioned within the helical groove, and spaced tongues protruding down from the first end;
    a lower housing having a semi-spherical portion and a flange including spaced grooves in alignment with the tongues of the piston;
    an electro/mechanical switch assembly disposed within the piston and including a contact ring; and
    a contact pin assembly extending through the piston and including at least one contact pin positioned to contact the contact ring;
    wherein the collision sensing system is configured such that deflection in a X or Y direction of a rotary welding torch mounted to the collision sensing system rotates the lower housing about an X axis or a Y axis respectively, misaligning the tongue and groove and sliding the helical groove along the ball roller, thereby rotating and lifting the piston and breaking contact between the at least one contact pin and contact ring, the X direction and the Y direction being orthogonal to one another.

2. The collision sensing system of claim 1 wherein the contact pin assembly is operably coupled to the rotary welding torch and breaking contact between the at least one contact pin and contact ring terminates operation of the rotary welding torch.

3. The collision sensing system of claim 2 wherein the contact pin assembly includes two or more contact pins.

4. The collision sensing system of claim 3 wherein breaking contact between one of the two or more contact pins and the contact ring terminates operation of the coupled rotary welding torch.

5. The collision sensing system of claim 1 including a bottom cap having a semi-spherical interior portion that complements the semi-spherical portion of the lower housing.

6. The collision sensing system of claim 1 including a top cap mounted to the outer housing, the top cap configured to mount the collision sensing system to a robotic arm.

7. The collision sensing system of claim 6 including a thrust bearing and a compression spring positioned between the piston and the top cap.

8. The collision sensing system of claim 7 wherein the thrust bearing and compression spring preload the contact between the tongue and groove of the piston and lower housing and preload the contact between the lower housing and bottom cap, thereby maintaining the position of the piston and contact between the contact pins and contact ring during movement of the rotary welding torch.

9. A collision sensing system for use with a robotic arm and a rotary welding torch, the collision sensing system comprising:
    an outer housing including a ball roller mounted to the outer housing,
    a piston including a tongue that protrudes below a lower surface of the piston, wherein the piston includes a helical groove on an exterior surface thereof, the ball roller received within the helical groove;
    a lower housing including a flange having a groove, the groove aligned with the tongue of the piston;
    an electro/mechanical switch assembly including a contact ring; and
    a contact pin assembly including at least one contact pin adapted to contact the contact ring;
    wherein the collision sensing system is configured such that a collision which ceases spinning of a rotary welding torch mounted to the collision sensing system creates torsion throughout the collision sensing system and rotates the lower housing about a Z axis, wherein rotation of the lower housing about the Z axis moves the tongue and groove out of alignment, thereby lifting the piston and breaking contact between the at least one contact pin and contact ring.

10. The collision sensing system of claim 9 wherein rotation of the lower housing about the Z axis both misaligns the tongue and groove and moves the helical groove along the ball roller, additively rotating and lifting the piston.

11. The collision sensing system of claim 10 wherein the contact pin assembly is operably coupled to a robotic arm, and breaking contact between the at least one contact pin and contact ring terminates operation of the robotic arm.

12. The collision sensing system of claim 11 wherein the contact pin assembly includes two or more contact pins.

13. The collision sensing system of claim 12 wherein breaking contact between one of the two or more contact pins and the contact ring terminates operation of the robotic arm.

14. The collision sensing system of claim 9 including a top cap mounted to the outer housing, the top cap configured to mount the collision sensing system to the robotic arm.

15. The collision sensing system of claim 9 wherein the lower housing is configured to couple the rotary welding torch to the collision sensing system.

16. A collision sensing system for use with a robotic arm and a rotary welding torch, the collision sensing system comprising:
an outer housing;
a piston including a tongue that protrudes below a lower surface of the piston;
a lower housing including a flange having a groove, the groove aligned with the tongue of the piston;
an electro/mechanical switch assembly including a contact ring; and
a contact pin assembly including at least one contact pin adapted to contact the contact ring;
wherein the collision sensing system is configured such that a collision which ceases spinning of a rotary welding torch mounted to the collision sensing system creates torsion throughout the collision sensing system and rotates the lower housing about a Z axis, wherein rotation of the lower housing about the Z axis moves the tongue and groove out of alignment, thereby lifting the piston and breaking contact between the at least one contact pin and contact ring,
wherein the lower housing includes a semi-spherical portion, the collision sensing system including a bottom cap having a semi-spherical interior portion that complements the semi-spherical portion of the lower housing.

17. The collision sensing system of claim 16 wherein the complementary semi-spherical portions of the lower housing and bottom cap enable freedom of rotation for the lower housing to pivot about an X axis or a Y axis and to spin about the Z axis, the X axis, the Y axis, and the Z axis being orthogonal to one another.

* * * * *